United States Patent [19]

Ding

[11] Patent Number: 5,458,672
[45] Date of Patent: Oct. 17, 1995

[54] COMBUSTION OF SULFUR RELEASED FROM SULFUR BEARING MATERIALS

[75] Inventor: Maynard G. Ding, Yorktown Heights, N.Y.

[73] Assignee: Praxair Technology, Inc., Danbury, Conn.

[21] Appl. No.: 257,399

[22] Filed: Jun. 6, 1994

[51] Int. Cl.$^6$ ................................................ F23G 7/04
[52] U.S. Cl. .................................................... 75/643
[58] Field of Search .................................... 75/643

[56] References Cited

U.S. PATENT DOCUMENTS

| | | | |
|---|---|---|---|
| 3,281,236 | 10/1966 | Meissner | 75/643 |
| 4,001,013 | 1/1977 | Goto et al. | 25/72 |
| 4,204,861 | 5/1980 | Petersson et al. | 75/73 |
| 4,274,870 | 6/1981 | Yanno Paulos | 75/73 |
| 4,470,845 | 9/1984 | Yanno Paulos | 75/23 |
| 4,541,796 | 9/1985 | Anderson | 431/187 |
| 4,857,104 | 8/1989 | Victorovich et al. | 75/21 |
| 4,863,371 | 9/1989 | Ho | 431/9 |
| 4,907,961 | 3/1990 | Anderson | 431/8 |
| 4,946,382 | 8/1990 | Kobayashi et al. | 431/8 |
| 4,969,814 | 11/1990 | Ho et al. | 431/8 |
| 4,988,285 | 1/1991 | Delano | 431/5 |
| 5,022,332 | 6/1991 | Ding | 140/346 |
| 5,076,779 | 12/1991 | Kobayashi | 431/5 |
| 5,242,296 | 9/1993 | Tuson et al. | 431/10 |

OTHER PUBLICATIONS

Waste Combustion in Boilers and Industrial Furnaces, Mar. 2–4, 1993 "The use of Oxygen for Spent Acid Recovery and Hazardous Waste Disposal", by Maynard G. Ding.

*Primary Examiner*—Peter D. Rosenberg
*Attorney, Agent, or Firm*—Chung K. Pak; Douglas E. Denninger

[57] ABSTRACT

A Process for combusting sulfur vapor released from a sulfur bearing material, comprising:

(a) introducing a sulfur bearing material into a furnace having a combustion zone;

(b) ejecting at least one fuel stream with or without a substoichiometric amount of at least one primary oxidant stream and combusting said at least one fuel stream with the substoichiometric amount of the primary oxidant stream or ambient gas in the combustion zone to produce heat sufficient to release some sulfur vapor from the sulfur bearing material and to form combustion products containing unburned fuel;

(c) ejecting at least one secondary oxidant stream angled away or spaced from the fuel stream and primary oxidant stream;

(d) causing a recirculating flow within the combustion zone to dilute at least a portion of the combustion products, secondary oxidant, sulfur vapor, unburned fuel and ambient gas in the furnace; and (e) combusting the sulfur vapor and the unburned fuel with said secondary oxidant. Alternatively, the fuel stream may be introduced with a superstoichiometric amount of the primary oxidant stream, with or without the secondary oxidant, such that excess oxygen is reacted with sulfur vapor released from the sulfur bearing material to produce more heat.

15 Claims, 2 Drawing Sheets

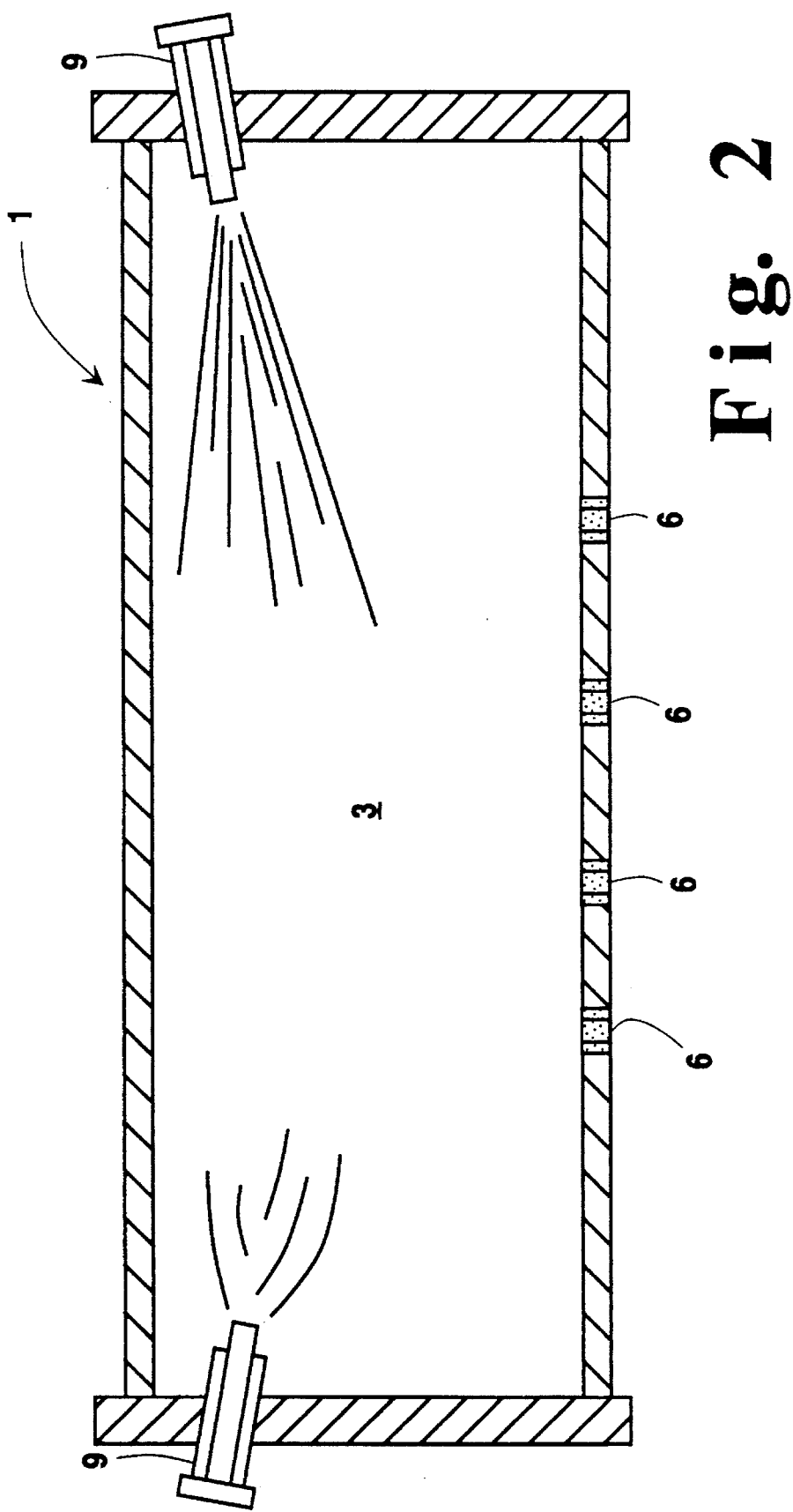

COMBUSTION OF SULFUR RELEASED FROM SULFUR BEARING MATERIALS

FIELD OF THE INVENTION

The present invention relates generally to combustion of sulfur and, more particularly, to combustion of sulfur vapor released during metal smelting, with reduced generation of nitrogen oxides.

BACKGROUND OF THE INVENTION

Metal smelting processes are normally carried out with an auxiliary burner that utilizes air, oxygen enriched air or technically pure oxygen as the oxidant. Technically pure oxygen or oxygen enriched air is typically employed as the oxidant in order to improve the smelting rate of the metal bearing materials. The use of technically pure oxygen or oxygen enriched air, however, produces significantly increased peak flame temperature over that produced by using air as the oxidant. This high peak flame temperature kinetically favors the formation of nitrogen oxides.

During metal smelting operation, sulfur is released from metal bearing materials. Sulfur is then combusted to form sulfur dioxides. Thus, the gas resulting from the smelting operation contains sulfur dioxides. This gas is normally contaminated with a small amount of nitrogen oxides due to nitrogen oxides which is formed during combustion of sulfur and fuel with oxidant. The amount of nitrogen oxides contamination is increased with the increased generation of nitrogen oxides. As a result of the presence of nitrogen oxide in the gas, the sulfur dioxides therein is also contaminated with nitrogen oxides. Since the contaminated sulfur dioxides is often used to produce by-product sulfuric acid, the purity of the by-product sulfuric acid is lowered. This low quality sulfuric acid is often commercially undesirable because nitrogen oxides impurities may interfere with the end use of the resulting sulfuric acid and may cause corrosion problems.

Accordingly, it is an object of the invention to provide a method for combusting sulfur with reduced contamination of the resulting gaseous product with nitrogen oxides.

It is another object of the invention to provide a smelting gas which is useful for producing high quality sulfuric acid.

It is yet another object of the invention to utilize technically pure oxygen or an oxygen enriched air as the oxidant to improve the smelting rate of metal bearing materials and, at the same time, combust sulfur vapor released from the metal bearing materials to form sulfur dioxides with reduced contamination of sulfur dioxides with nitrogen oxides.

SUMMARY OF THE INVENTION

According to one embodiment of the present invention, the above objectives have been achieved by a process for combusting sulfur vapor released from a sulfur bearing material, said process comprising:

(a) introducing a sulfur bearing material into a furnace having a combustion zone;

(b) ejecting at least one fuel stream with or without a substoichiometric amount of at least one primary oxidant stream from at least one burner and combusting said at least one fuel stream with said substoichiometric amount of said primary oxidant stream and/or ambient gas in said combustion zone to produce heat sufficient to release some sulfur vapor from said sulfur bearing material and to form combustion products containing unburned fuel;

(c) ejecting at least one secondary oxidant stream angled away or spaced from said fuel stream and primary oxidant stream;

(d) causing a recirculating flow within said combustion zone to dilute at least a portion of said combustion products, secondary oxidant, sulfur vapor and ambient gas in said furnace; and (e) combusting said sulfur vapor and said unburned fuel with said secondary oxidant. An additional sulfur is released upon combusting the sulfur vapor and unburned fuel with the secondary oxidant. The additional sulfur vapor released is combusted with the secondary oxidant to provide additional heat which in turn releases additional sulfur and possibly melts the sulfur bearing materials.

According to another embodiment of the present invention, the above objectives have been achieved by a process for combusting sulfur vapor released from a sulfur bearing material, said process comprising:

(a) introducing a sulfur bearing material into a furnace having a combustion zone;

(b) ejecting at least one fuel stream and a superstoichiometric amount of at least one primary oxidant stream and combusting said at least one fuel stream with said superstoichiometric amount of said primary oxidant stream to produce heat sufficient to release some sulfur vapor from said sulfur bearing material and to form combustion products containing excess oxygen;

(c) causing a recirculating flow within said combustion zone to dilute at least a portion of said combustion products, excess oxygen, sulfur vapor and ambient gas in said furnace; and (d) combusting at least a portion of said sulfur vapor with said excess oxygen.

As used herein the term "ambient gas" means gases in a furnace or a combustion zone. The ambient gas typically has an oxygen concentration of less than 21% by volume, e.g., 5 to 15% by volume.

BRIEF DESCRIPTION OF THE DRAWING

FIG. 2 is a side view of one embodiment of the present invention.

DETAILED DESCRIPTION OF THE INVENTION

Figure 1:
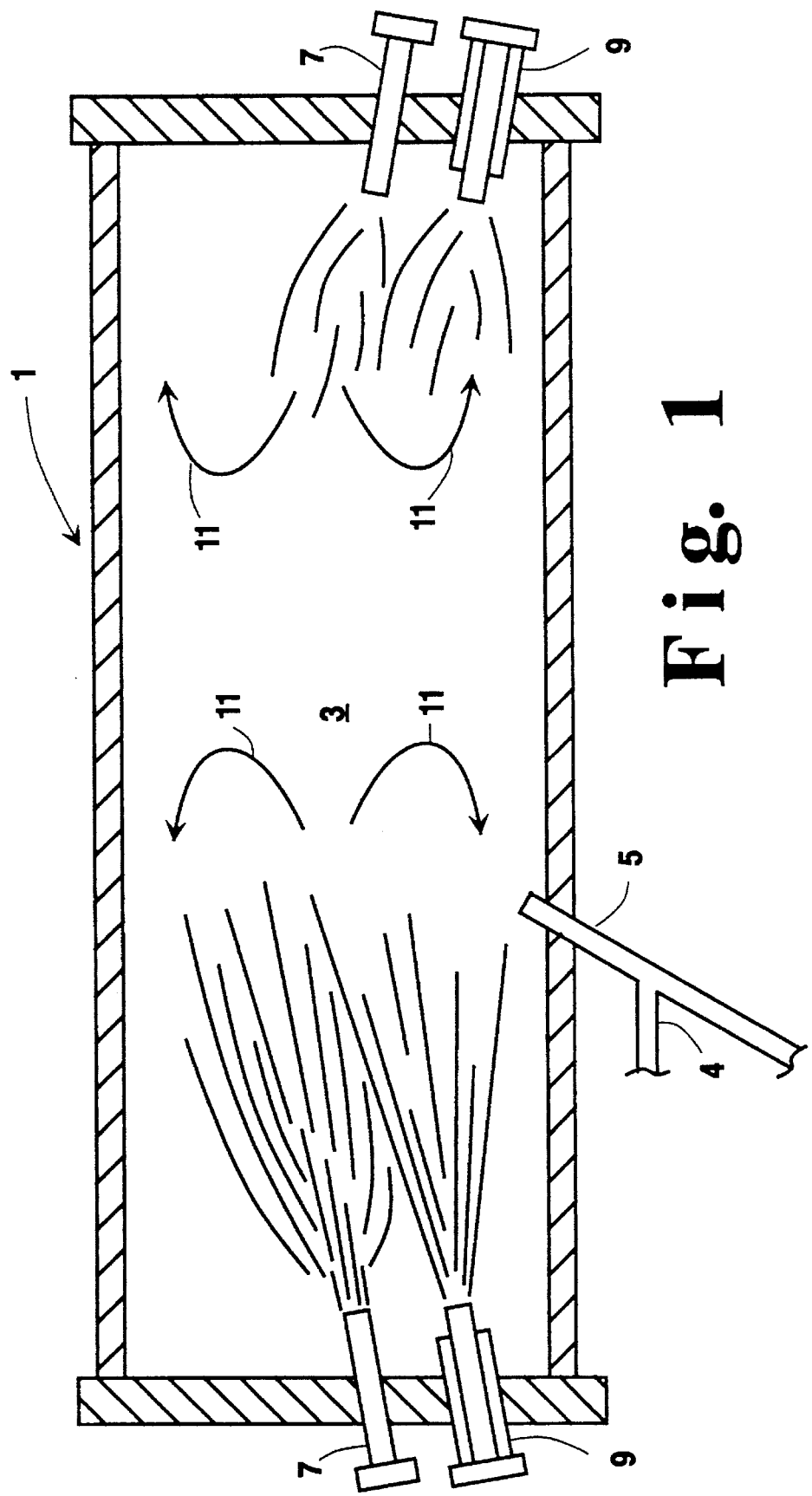
FIG. 1 is a plain top view of one embodiment of the present invention.

The present invention relates to combusting sulfur in a particular manner to avoid or reduce contamination of the resulting sulfur dioxides with nitrogen oxides. By reducing contamination, the resulting sulfur dioxide gas can be effectively and efficiently used to prepare high purity sulfuric acid. In addition, heat resulting from combustion of sulfur and fuel with oxidant can be used to release sulfur from sulfur bearing materials in vapor form. When the sulfur bearing materials contains metals, such as copper, such heat can help melt and refine the metals while producing, at the same time, high purity sulfur dioxides. Sulfur is found to be, not only useful producing sulfur dioxides, but also useful for providing a substantial amount of heat for melting metals.

The present invention will be described in detail in reference to the drawings in conjunction with smelting metal bearing materials. The preference for combusting sulfur, which is released from metal bearing materials during smelting processes, in no way precludes combusting of sulfur released from other sources. Moreover, the preference for specific combustion arrangements in no way precludes other combustion arrangements which would be apparent from reading of the following disclosure.

Referring now to FIGS. 1 and 2, sulfur bearing materials are fed to a reactor/furnace (1) having a combustion zone (3) through at least one conveying means, such as at least one tuyere injector (5) using gas, such as air, as a conveying medium. Additional air may be supplied to the tuyere injector (5) through a conduit (4) in order to prevent clogging during feeding tank switching. The location of the tuyere injector (5) is such that the sulfur bearing materials can be horizontally injected at approximately a halfway (level height) of a bath of the sulfur bearing meterials in the reactor/furnace (1). In addition, air may be introduced through a plurality of porous plugs 6 aligned along the bottom of the furnace (1) to. agitates the sulfur bearing materials. The sulfur bearing materials employed may be any material that can be used to release sulfur upon heating. It is, however, desirable to use materials which contain both metal and sulfur since they can be used to provide sulfur and, at the same time, produce refined metals (products from smelting processes). The materials include, among other things, chalcopyrite, bornite, corellite, pyrite.

Oxidant is provided into the combustion zone (3) of the furnace (1) through at least one lance (7) and/or at least one burner (9). The oxidant fed to the burner (9) is referred to as primary oxidant while the oxidant fed to the lance (7) is referred to as secondary oxidant. The primary and secondary oxidant may be air, an oxygen enriched air or technically pure oxygen (having an oxygen concentration of about 99.5%). Preferably, the oxidant employed has an oxygen concentration of greater than 30% by volume. More preferably, the oxidant employed has an oxygen concentration of greater than 90% by volume. Sources for the preferred oxidant include, inter alia, a gas or liquid oxidant storage container, a cryogenic air separation plant, a pressure or temperature swing adsorption plant, a membrane gas separation plant and/or an electrolyte membrane gas separation system. Of these sources, a solid electrolyte ionic conductor membrane gas separation system and other membrane gas separation systems, a cryogenic air separation plant and a pressure or temperature swing adsorption plant are found to be most useful since , with these sources, the preferred oxidant can be fed continuously at desired pressure to carry out combustion in a continuous manner.

Fuel is also introduced to the combustion zone (3) through at least one burner (9). The fuel employed may be liquid fuel, gaseous fuel and/or solid fuel. Of these fuel, the liquid fuel, such as fuel oil or contaminated waste oil, and gaseous fuel, such as natural gas, propane or a gaseous waste stream containing light hydrocarbons, are most preferred.

Upon introduction of the fuel, the fuel is combusted with ambient gas, the primary oxidant and/or the secondary oxidant to produce combustion reactions products. The combustion reaction products contain, among other things, carbon dioxides, water vapor, sulfur dioxides. When the fuel is introduced through the burner (9) without oxygen or with a substoichiometric amount of oxygen, the combustion reaction products also contain unburned fuel. On the other hand, if the fuel is introduced through the burner (9) with a super-stoichiometric amount of oxygen, the combustion products contain excess oxygen. Normally, the composition of the combustion reaction products may vary depending on the composition of the fuel and/or the process-feeding materials.

The combustion produces heat sufficient to release some sulfur from the metal bearing materials, such as copper bearing materials nickel bearing materials or lead bearing materials. The released sulfur in vapor form is then combusted with excess oxygen in the combustion zone (3) to form sulfur dioxides as a major combustion reaction product. Sulfur behaves as fuel and generates additional heat. The heat generated from combustion of the fuel and some sulfur is used to further release additional sulfur which in turn is combusted to generate more heat. This heat releases more sulfur for combustion and finally melt the metal bearing materials in order to proceed with the smelting process. In the meantime, the sulfur dioxides-laden off gas from the combustion zone (3) is directed to a gas cleaning and conditioning step and then to an acid plant. In the acid plant, purified sulfur dioxides is catalytically converted to sulfur trioxides which is then converted to sulfuric acid in an adsorption tower. The resulting sulfuric acid is recovered as a by-product. When a less amount of nitrogen oxides is formed during the combustion, the purity of by-product sulfuric acid recovered is improved.

The combustion is preferably carried out with the aspirator burners or high velocity burners described and/or claimed in U.S. Pat. Nos. 4,378,205, 4,541,796 and 4,901,961, incorporated herein by reference. The tip of the preferred burner may be recessed about 2 to 6 inches from the opening end of a burner port to prevent splashing and/or slopping of the melt and avoid clogging of the burner nozzle. However, recessing the burner more than 6 inches could result in combustion inside the burner port and cause unnecessary refractory damage. Optionally, non-wetting materials, such as ceramic materials or silicon nitride, may be applied to the tip of the burner or used as the tip of the burner to avoid clogging of the burner nozzle. The burner may also be angled away from the lance (7) to delay the mixing of the primary oxidant and the secondary oxidant.

During the combustion reaction, the velocity of the primary and/or secondary oxidant is such that it or they causes a recirculation flow to occur within the combustion zone (3). This recirculation flow causes the combustion reaction products, unconverted sulfur vapor and possibly unburned fuel and the secondary and/or primary oxidant within the combustion zone (3) to recirculate, such as shown by arrows (11). This causes dilution of the combustion reaction of the fuel, sulfur and oxidant and enable the combustion reaction to proceed at a low peak flame temperature. In addition, the high injecting velocity of the primary oxidant will aspirate the combustion products prior to reacting with the fuel, thus further promoting a low peak flame temperature. The primary oxidant velocity should be high enough to allow for an entrainment (aspirating) ratio of at least 3, preferably at least 5, in order to cause noticeable effects on the peak flame temperature. The term "entrainment ratio" is defined as an amount (mass) of combustion products aspirated into the oxygen jets prior to the mixing with fuel. The low peak flame temperature resulting from the dilution and aspiration, in turn, inhibits the formation of nitrogen oxides which would contaminate the resulting gas stream containing sulfur dioxides. By minimizing the contamination, the resulting gas stream containing sulfur dioxides can be used to produce high purity sulfuric acid in an effective and efficient manner.

The recirculation flow also provides enhanced mixing of the oxidant, fuel and sulfur. The enhanced mixing in turn promotes the temperature uniformity for effective heating in the smelting process, and provides a mechanism for carrying out combustion in a manner which reduces or eliminates local hot spots within the furnace (1). Reducing or eliminating local hot spots improves the structural life of equipment including the furnace (1) while effective heating allows for efficient smelting of the metal bearing materials.

The injecting velocity of the primary oxidant and/or the secondary oxidant is at least 300 feet per second, preferably in the rang of about 500 to 2000 feet per second. This velocity is sufficient to cause a recirculation flow whether the primary oxidant or the secondary oxidant alone or in combination is injected. The primary oxidant injected through the burner (9), for example, is such that the ratio of the primary oxidant to the fuel introduced is in the range of about 0:1 to greater than 2:1 based on volume. In other words, the amount of the primary oxidant injected can be zero, a substoichiometric amount (an amount of oxygen insufficient to react with all the fuel injected, i.e.,the primary oxidant to the fuel ratio of less than 2) or a super-stoichiometric amount (an amount of oxygen sufficient to react with all the fuel injected and provide excess oxygen, i.e., the primary oxidant to the fuel ratio of greater than 2). However, the use of extremely off-stoichiometric ratios, i.e., extremely fuel-rich conditions (the primary oxidant to the fuel ratio of less than 1.5) or fuel lean conditions (the primary oxidant to the fuel ratio of greater than 4), is most desirable because such extreme conditions further enhance combustion of sulfur and fuel with oxidant and further reduce thermal nitrogen oxides formation. Under the extremely fuel lean conditions, the unused oxygen from the burner (9) will react with the sulfur released from the metal bearing materials to form sulfur dioxides. Under the extremely fuel-rich conditions, the unburned fuel will react with the secondary oxidant from the lance (7).

The lance (7) injects the secondary oxidant spaced from or angled away from the fuel stream. The direction of the secondary oxidant coupled with its high velocity can establish a recirculation flow without introducing the high velocity primary oxidant. The spacing distance between the lance (7) and the burner (9) is at least 3 inches, preferably at least 6 inches, more preferably at least 12 inches. If the lance (7) is angled away from the direction of the fuel stream from the burner (9), no spacing may be needed. At least, the spacing distance may be decreased. The lance (7) can be located above the surface of the molten bed in a smelting furnace or underneath the surface of the molten bath in a smelting furnace. If it is placed underneath the surface of the molten bath, the velocity of the primary oxidant should be sufficient to establish a recirculation flow within the combustion zone (3). It is understood that the secondary oxidant may not be needed if, for example, the super-stoichiometric amount of the primary oxidant is introduced through the burner (9). However, the use of the secondary oxidant from the lance (7) is found to be useful in reducing nitrogen oxides since the operations of the lance (7) and the burner (9) affect the heat release pattern and thermal nitrogen oxides formation. The aspirator burners or high velocity burners described and/or claimed in U.S. Patent Nos. 4,378,205, 4,541,796 and 4,901, 961 can also be used as the oxygen lance (7) if the high velocity secondary oxidant is desirable.

The following example serves to illustrate the invention. It is presented for illustrative purposes and is not intended to be limiting.

EXAMPLE

About 27000 tons of copper bearing materials were processed through a rotary reactor/furnace. The copper bearing materials were introduced into the reactor/furnace at a rate of about 29 to about 60 tons per hour through two tuyere injectors having an internal diameter of about 2 inches. The tuyere injectors, which operated at a pressure of about 550 to about 620 Kpa, were particularly placed so that the copper bearing materials were horizontally injected at about 0.56 meter above the bottom of the reactor/furnace. Air was used to convey the copper bearing materials through the tuyere injectors. Air was fed at about 350 to 380 $Nm^3$/hour. Also, additional air was directly fed to the tuyere injectors through a different conduit at about 1500 $Nm^3$/hour to prevent clogging during feeding tank switching. This additional air, referred to as supplemental air, was regulated with a pressure valve according to the back pressure at the tuyere injectors and was typically reduced to zero during injection of the copper bearing materials. Two oxygen-fuel burners described and claimed in U.S. Pat. No. 4,901,961 were installed on the opposite sides of the reactor/furnace to provide sufficient heat release some sulfur from the copper bearing materials and possibly combust the released sulfur in vapor form to form sulfur dioxides. The burners employed its annular passageway for passing natural gas fuel and its central passageway for passing technically pure oxygen. The natural gas firing rate for each burner was about 260 to about 340 $Nm^3$/hour. The volume of oxygen fed to each burner to provide an oxygen to fuel ratio of 1 (50% stoichiometric amount of oxygen). Additional oxidant was fed through two lances located at the same opposite sides where the burners were located. Each lance was spaced from each burner on the same side by a distance of about 24 inches. The rate of oxygen introduced throught each lance was 3360 $Nm^3$/hour. Upon combusting the fuel with a substoichiometric amount of oxygen fed to each burner, combustion reaction products containing unburned fuel were produced. Heat generated from the combustion reaction was used to release some sulfur from the copper bearing materials. Sulfur was combusted with the oxygen from each lance and/or burner to generate more heat to release more sulfur from the copper bearing materials for combustion and finally to melt the copper bearing materials. The oxygen injected through each burner at a velocity of about 500 feet per second caused aspiration of combustion products so that the oxygen is mixed with combustion products before being reacted with the fuel. At the same time, the high velocity oxygen from each burner also established a recirculation flow, thereby mixing oxygen from the lances and/or burners with ambient gas in the furnace and/or combustion reaction products before being used for combustion. This recirculation flow, aspiration effects and a fuel-lean condition diluted the combustion reaction whereby low flame peak temperature was obtained. The temperature uniformity within the reactor/furnace was also promoted. The resulting molten bath was maintained at about 1190° to about 1200° C. The off-gas from the reactor/furnace contains a substantial amount of sulfur dioxides with reduced nitrogen oxides contamination. The nitrogen oxide level in the off-gas was reduced by a factor of 4 to 1, when it was compared to those off-gases produced by a previous oxygen-fuel burner arrangement. This off-gas was treated in a gas cleaning and conditioning means and then catalytically converted to sulfur trioxides. The resulting sulfur trioxides was absorbed with diluted sulfuric acid to form high concentrate sulfuric acid so that it can be recovered as a by-product. The nitrogen oxide level in the sulfuric acid was reduced to 0–20 ppm. This reduction was found to be significant since the sulfuric acid produced previously through using a different oxygen-fuel burner arrangement had a nitrogen oxides level of 20–30 ppm. A substantial part of this reduction was attributed to the present invention.

By using particular burner and lance arrangements (properly placing oxygen-fuel burners and lances and properly feeding various feed streams, e.g., fuel and oxygen injection rates) in smelting operations, the off-gas stream containing sulfur dioxide with reduced nitrogen oxides contamination is found to be produced. The resulting off-gas having reduced amount of nitrogen oxides, when used to prepare sulfuric acid, decreases the level of nitrogen oxides dissolved in the resulting sulfuric acid. In addition, heat generated therefrom is uniformly distributed, thus effectively melting metal bearing materials in an efficient manner.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A process for combusting sulfur vapor released from a sulfur bearing material, said process comprising:
   (a) introducing a sulfur bearing material into a furnace having a combustion zone;
   (b) injecting at least one fuel stream with a substoichiometric amount of at least one primary oxidant stream from at least one burner and combusting said least one fuel stream with said substoichiometric amount of said primary oxidant stream and/or ambient gas in the combustion zone to produce heat sufficient to release some sulfur vapor from said sulfur bearing material and to form combustion reaction products containing unburned fuel, the primary oxidant stream having an oxygen concentration of greater than 30% by volume;
   (c) injecting at least one secondary oxidant stream angled away or spaced from said fuel stream at a velocity of at least 300 feet per second to cause a recirculating flow within said combustion zone and to mix at least a portion of said combustion reaction products, secondary oxidant, sulfur vapor, unburned and ambient gas in said furnace, the secondary oxidant stream having an oxygen concentration of greater than 30% by volume; and
   (d) combusting said sulfur vapor and said unburned fuel with said secondary oxidant.

2. The process according to claim 1, further comprising aspirating said combustion reaction products prior to reacting said primary oxidant with said fuel stream.

3. The process according to claim 2, wherein said primary oxidant injected is such that an entrainment ratio is greater than 3.

4. The process according to claim 1, wherein said recirculating flow dilutes the combustion reaction caused by said sulfur vapor and fuel reacting with said primary and secondary oxidants.

5. The process according to claim 1, wherein said combustion of said sulfur vapor releases more sulfur from said sulfur bearing material for combustion.

6. The process according to claim 5, wherein said sulfur bearing material further contains metals and wherein said metals is melted during the combustion to form a molten bath.

7. The process according to claim 6, wherein said secondary oxidant stream is injected underneath the surface of the molten bath.

8. The process according to claim 1, wherein said at least one burner is angled to inject the primary oxidant away from said secondary oxidant.

9. The process according to claim 1, wherein said at least one burner is at least two burners located at the opposite sides of said furnace.

10. A process for combusting sulfur vapor released from a sulfur bearing material, said process comprising:
    (a) introducing a sulfur bearing material into a furnace having a combustion zone;
    (b) injecting at least one fuel stream and a superstoichiometric amount of at least one primary oxidant stream with a burner and combusting said at least one fuel stream with said superstoichiometric amount of said primary oxidant stream to produce heat sufficient to release some sulfur vapor from said sulfur bearing material and to form combustion products containing excess oxygen, said primary oxidant stream having an oxygen concentration of greater than 30% by volume and being injected at a velocity of at least 300 feet per second to cause a recirculating flow within said combustion zone to dilute at least a portion of said combustion products, excess oxygen, sulfur vapor and ambient gas in said furnace; and
    (c) combusting at least a portion of said sulfur vapor with said excess oxygen.

11. The process according to claim 10, further comprising introducing secondary oxidant stream from a lance spaced away from said burner to further combust said sulfur vapor.

12. A process for combusting sulfur vapor released from a sulfur bearing material, said process comprising:
    (a) introducing a sulfur bearing material into a furnace having a combustion zone;
    (b) injecting at least one fuel stream from at least one burner and combusting said at least one fuel stream with ambient gas in the combustion zone to produce heat sufficient to release some sulfur vapor from said sulfur bearing material and to form combustion reaction products containing unburned fuel;
    (c) injecting at least one oxidant stream angled away or spaced from said fuel stream at a velocity of at least 300 feet per second to cause a recirculating flow with said combustion zone and to mix at least a portion of said combustion reaction products, oxidant, sulfur vapor, unburned and ambient gas in said furnace, the oxidant stream having an oxygen concentration of greater than 30% by volume; and
    (d) combusting said sulfur vapor and said unburned fuel with said oxidant.

13. The process according to claim 1, wherein both said primary and secondary oxidant streams have an oxygen concentration of greater than 90% by volume.

14. The process according to claim 10, wherein said primary oxidant stream has an oxygen concentration of greater than 90% by volume.

15. The process according to claim 12, wherein said oxidant stream has an oxygen concentration of greater than 90% by volume.

* * * * *